Aug. 21, 1951  C. B. LUBBERT  2,564,786
DRILLING JIG FOR ANGLE IRONS
Filed Nov. 4, 1947
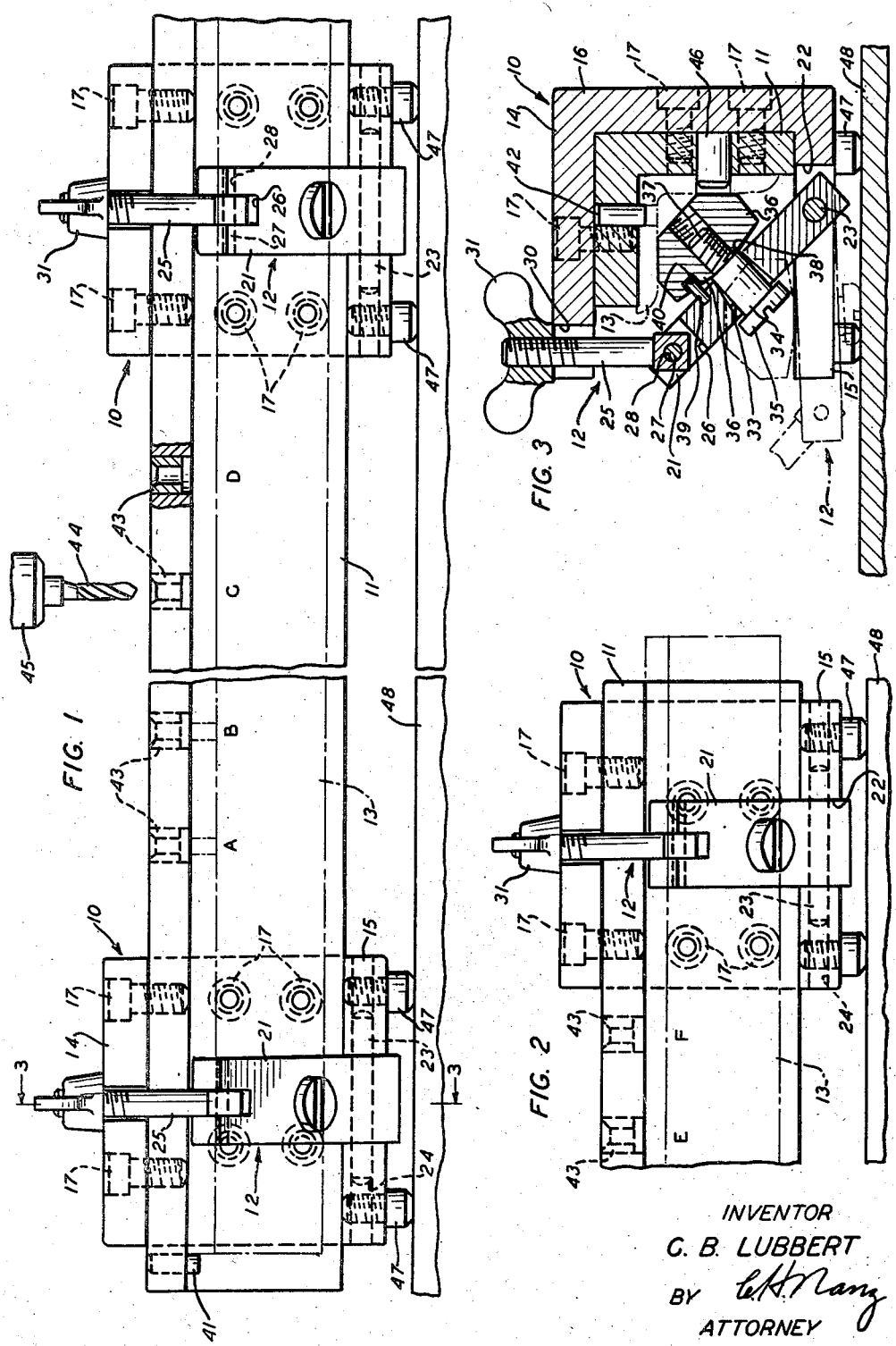
INVENTOR
C. B. LUBBERT
BY [signature]
ATTORNEY Patented Aug. 21, 1951

2,564,786

UNITED STATES PATENT OFFICE 2,564,786

DRILLING JIG FOR ANGLE IRONS

Carl B. Lubbert, Anneslie, Md., assignor to Western Electric Company, Incorporated, New York, N. Y., a corporation of New York Application November 4, 1947, Serial No. 783,964

1 Claim. (Cl. 77—62)

This invention relates to fixtures for holding elongated articles during drilling operations, and more particularly to drill jigs for angle irons.

In the manufacture of communications equipment, angle irons are used extensively in the fabrication of frames on which the various types of apparatus are mounted. An angle iron frame includes a plurality of angle irons of various lengths arranged to form the desired shape of the framework. At least some of the angle irons must be provided with suitable holes for securing the angle irons together and also for mounting apparatus on the frame. In order to facilitate rapid manufacture of such angle iron frames, the individual members of the frame are processed in substantially large quantities. Those members in which a plurality of holes are to be drilled in accordance with a predetermined pattern require a suitable fixture or drill jig for holding the angle iron during the drilling operation and for effecting a rapid transfer of a plurality of holes from a given template or pattern to the angle iron.

The fixture must be arranged to support the angle iron so that the leg thereof in which the holes are to be drilled is substantially horizontal with respect to the work table of the machine performing the drilling operation and must permit easy insertion and removal of the angle iron. In the past fixtures for holding angle irons have been arranged so that the angle iron must be slid longitudinally into the fixture. In areas where the working space allowed for performing the drilling operation on such elongated angle irons is limited, the fixture must be arranged so that the angle iron may be inserted lengthwise into the fixture.

An object of the invention is to provide new and improved fixtures for holding angle irons during drilling operations thereon.

A drill jig for holding angle irons embodying certain features of the invention comprises an elongated template having a predetermined drilling pattern provided therein, means for supporting the template in a horizontal position, and means for clamping an angle iron to be drilled in the template, whereby the drilling plan of the template may be transferred to the angle iron clamped therein.

A clear understanding of the invention will be had from the following detailed description of a specific embodiment thereof, when read in conjunction with the appended drawing, in which:

Fig. 1 is a front, elevational view of a portion of a drill jig for holding angle irons;

Fig. 2 is a front, elevational view of a right hand end portion of the drill jig shown in Fig. 1, and Fig. 3 is a vertical, cross sectional view taken along line 3—3 of Fig. 1.

Referring now to the drawing, it will be noted that a preferred embodiment of the invention comprises a plurality of U-shaped supports 10—10 (Figs. 1 and 2) spacedly positioned on an elongated template 11 having a right angle cross section, as seen in Fig. 3. Each of the supports 10—10 is provided with clamping means indicated generally at 12—12 for clamping an elongated angle iron 13 against the corresponding inner surfaces of the template 11. The supports 10—10 and their respective clamping means 12—12 are identical in construction and operation. Therefore, the following description will be directed only to the support 10 shown in the upper left hand corner of Fig. 1, a cross sectional view of which is shown in Fig. 3.

The U-shaped support 10 consists of an upper horizontal leg 14, a lower horizontal leg 15 spaced a predetermined distance apart and parallel to each other by a vertical leg 16 which is rigidly secured to one end of each of the legs 14 and 15. The composite U-shaped supports 10—10 are secured to the template 11 by conventional machine screws 17—17.

The clamping means 12 provided on the U-shaped support 10 comprises an arm 21 pivotally mounted at one end thereof in a slot 22 provided in the leg 15 of the support 10 by means of a pin 23 positioned in a bore 24 provided in the portions of the leg 15 adjacent to the slot 22. A latch bolt 25 has one end thereof pivotally mounted in a slot 26 provided in the free end of the arm 21 by a pin 27 positioned in a bore 28 provided in the portions of the end of the arm 21 adjacent to the slot 26. The leg 14 of the support 10 is provided with a slot 30 for receiving the free end of the bolt 25 when it is positioned vertically, as shown in Fig. 3. The free end of the bolt 25 is threaded to receive a conventional wing nut 31 by means of which the arm 21 may be raised or lowered as desired.

The arm 21 is provided with a tapered bore 33 to receive in a relatively loose manner a body portion 34 of a stud 35. An irregularly shaped nut 36 is threadedly mounted on a threaded end 37 of the stud 35 until the face thereof abuts a shoulder 38 formed at the junction point of the body 34 and the threaded end 37. The length of the body portion 34 of the stud 35 is slightly greater than the thickness of the arm 21 so that when the nut 36 is screwed tightly against the shoulder 38, substantial play exists between the nut and the inner face of the arm 21 and between the head of the stud 35 and the outer face of the arm.

The nut 36 is provided with a pair of accurately machined surfaces at substantially 90° with respect to each other, which machined surfaces are arranged to engage the inner surface of the opposite legs of an angle iron, such as the angle iron 13, which is to be clamped in the template 11. A pin 39 is secured in the arm 21 so as to loosely engage a recess 40 provided in the face of the nut adjacent to the inner face of the arm. This arrangement prevents the nut from turning with respect to the arm 21 and at the same time provides for a rocking movement of the body 34 of the stud within the bore 33. The ability of the stud 35 to rock within the tapered bore 33 permits the nut 36 to seat itself against the inner legs of the angle iron 13 against which it is to be clamped by means of the arm 21, the bolt 25 and the wing nut 31.

By loosening the wing nut 31 the bolt may be withdrawn from the slot 30 provided in the leg 14 of the support 10 so that the arm 21 of the clamp 12 may be lowered to a substantially horizontal position shown by broken lines in Fig. 3. When the arm 21 is in its lowered position the angle iron 13 may be readily inserted in or removed from the template 11.

A pin 41 is positioned adjacent to the left end of the template 11 (Fig. 1) to engage the left end of the angle iron 13 and acts as a stop in locating the angle iron 13 in the template 11. In addition to the pin 41, pins 42 and 46 (Fig. 3) are provided in the template to properly orientate the legs of the angle iron 13 in the template 11 when the holes to be drilled in the angle iron must bear a definite relationship not only to a particular end of the angle iron but also to certain holes which have been previously located in the legs of the angle iron. The pins 41, 42 and 46 serve to locate the angle iron 13 in a predetermined position in the template 11 with respect to a plurality of drill bushings 43—43 positioned in the horizontal leg of the template 11 at points A, B, C, D, E, and F, in accordance with a predetermined drilling plan or pattern.

The drill bushings 43—43 serve to locate a conventional drill 44 positioned in a chuck 45 of a conventional drill press (not shown) so that holes may be drilled in the angle iron 13 at points A, B, C, D, E and F, respectively. In other words, the bushings 43—43 serve as means of transferring the hole pattern of the template 11 as determined by the location of the drill bushings therein to the angle iron 13 clamped in the template 11 by the clamps 12—12. A plurality of hardened steel feet 47—47 are secured on each of the supports 10—10 so as to locate the horizontal leg of the template 11 in which the drill bushings 43—43 are positioned parallel to a work table 48 associated with the conventional drill press of which only the drill 44 and the chuck 45 are included in the drawing.

Operation

The above-described apparatus operates in the following manner:

Let it be assumed that the composite drilling fixture comprising the supports 10—10, the template 11 and the clamping members 12—12 is positioned on the work table 48 of a conventional drill press (not shown) which is to perform the drilling operations. Each of the clamps 12—12 mounted on the supports 10—10 are placed in their open or lowered position, in which position the arms 21—21 assume a substantially horizontal position, as shown in Fig. 3. An angle iron, such as the angle iron 13, to be drilled in accordance with the location of the drill bushings positioned in the template 11 is placed in the template so that the left end of the angle iron engages the pin 41 and the pins 42 and 46 engage indexing holes provided in the opposite legs of the angle iron. Since the indexing pins 42 and 46 are of different diameters, it is possible to position the angle iron in the fixture in only one position.

After the angle iron has been properly positioned in the template 11, the arms 21—21 forming part of their clamping means 12—12 are positioned in an oblique position by positioning the bolts 25—25 in their respective slots 30—30 of the supports 10—10. This places the nuts 36—36 movably secured on the arms in position to engage the inner surfaces of the legs of the angle iron 13. Each of the wing nuts 31—31 are now turned in a direction which will draw its associated arm 21 upwardly and thereby urge the nut carried thereby tightly against the legs of the angle iron 13. The particular arrangement of the arm 21 and the nut 36 secured thereon is such that a two-directional thrust is directed against the angle iron when the wing nut 31 is turned in a direction to draw the free end of the arm 21 upwardly. This two-directional thrust imparted against the angle iron serves to simultaneously urge the angle iron upwardly against the horizontal leg of the template 11 and rearwardly against the vertical leg of the template 11.

After each of the clamping means 12—12 has been operated in this manner, the fixture is moved on the work table 48 until the drill bushing 43 located at point A is directly under the drill 44. With the fixture in this position the drill is lowered into the bore provided in the bushing and into engagement with the leg of the angle iron and positioned immediately below the drill bushing 43. Continued movement of the drill 44 will drill a hole in the angle iron 13 at point A. By successively positioning the drill bushings 43—43 located at points B, C, D, E and F in the template 11 under the drill 44, holes may be drilled in the angle iron 13 at these points whereby the complete drill pattern of the template is transferred to the leg of the angle iron 13. When the drilling operation on the angle iron 13 is complete, it is only necessary to turn the wing nuts of their respective clamping means a few turns and lower the arms 21—21 to their open position in order to be able to remove the drilled angle iron 13 from the fixture and insert another angle iron therein.

It will be noted that this type of drilling fixture for angle irons does not require that the angle iron be slid longitudinally into the fixture from one end thereof, which operation would require a working space approximately twice as long as the angle iron itself. Where the angle iron is of substantial length, it is believed to be apparent that the working space required to load a fixture from one end thereof would seriously hamper the use of such fixtures in factories where only limited working space is available. The above-described fixture can be loaded and unloaded in the space required for handling the particular angle iron involved.

While the above-described fixture is illustrated as having the drill bushings located only on the horizontal leg of the template 11, it is believed to be apparent that suitable feet may be inserted on the ends of the horizontal legs 14 and 15 of the U-shaped supports 10—10 which would facilitate positioning the fixture on the work table 48 so that the vertical leg 16 and the opposite leg of the angle iron 13 would now be in a horizontal position with respect to the work table 48. With the fixture in this position, holes could be drilled in the opposite leg of the angle iron 13 in accordance with any desired drilling plan.

What is claimed is:

A fixture for holding elongated angle iron members during drilling operations, which comprises an elongated member of right angle cross-section in which an angle iron member to be drilled may be positioned, a plurality of drill-guide bushings positioned in the member in accordance with a predetermined drilling pattern, a plurality of U-shaped supports secured spacedly on the member in such a position that the parallel legs of said supports are parallel to one of the legs of the member, means provided in the member for orienting the respective legs of the angle iron to be drilled with respect to the drill bushings in the member, an arm mounted pivotally on one of the legs of each of the U-shaped supports, a bolt mounted pivotally on the free end of each of the arms and arranged to engage slots provided in the opposite legs of the U-shaped supports, a wing nut threadedly mounted on the free end of each of the bolts for holding the arms in an oblique position with respect to the right angle legs of the member, and a lug loosely mounted on each of the arms and having two faces thereof disposed at right angles with respect to each other so as to be directly opposite the corresponding legs of the angle iron position in the member, whereby when the wing nut on the end of the belt is turned to draw the end of the arm upwardly the opposed faces of the lug engage the corresponding legs of the angle iron and exert a uniform two-directional thrust against the angle iron thereby clamping it firmly against the legs of the elongated member.

CARL B. LUBBERT.

REFERENCES CITED

The following references are of record in the file of this patent:

UNITED STATES PATENTS

| Number | Name | Date |
|---|---|---|
| 1,579,284 | Grotto | Apr. 6, 1926 |
| 2,342,059 | Moss | Feb. 15, 1944 |
| 2,367,582 | Honyoust | Jan. 16, 1945 |
| 2,389,184 | Cooke | Nov. 20, 1945 |
| 2,438,162 | Guest | Mar. 23, 1948 |

FOREIGN PATENTS

| Number | Country | Date |
|---|---|---|
| 603,023 | Germany | Sept. 21, 1934 |

OTHER REFERENCES

Oberg and Jones Text "Drilling Practice and Jig Design" (1915), pages 203 and 204, published by Industrial Press, New York. (Copy to be found in Div. 13.)